United States Patent [19]
Lean et al.

[11] 3,736,044
[45] May 29, 1973

[54] DISPERSIVE ACOUSTICAL DEFLECTOR FOR ELECTROMAGNETIC WAVES

[75] Inventors: Eric G. Lean, Mahopac; Carl G. Powell, Yorktown Heights, all of N.Y.

[73] Assignee: International Business Machines Corporation, Armonk, N.Y.

[22] Filed: June 30, 1971

[21] Appl. No.: 158,231

[52] U.S. Cl. .................................................350/161
[51] Int. Cl. .................................................G02f 1/32
[58] Field of Search .................350/160, 161, 96 WG

[56] References Cited

UNITED STATES PATENTS 3,617,931  11/1971  Pinnow.................................350/162
3,614,201  10/1971  Biazzo..................................350/161
3,617,109  11/1971  Tien.....................................350/160

*Primary Examiner*—William L. Sikes
*Attorney*—Jackson E. Stanland

[57] ABSTRACT

An acoustical deflector for electromagnetic waves using a dispersive medium for propagation of the acoustic waves. That is, the thickness of the medium is approximately the wavelength λ of the acoustic wave so that the phase velocity of the acoustic wave is a function of the acoustic wave frequency. Electromagnetic waves which interact with the acoustic wave fronts are deflected through different angles as the phase velocity of the acoustic wave changes due to frequency changes of this wave. Means are provided to excite an adjustable frequency acoustic wave in the dispersive medium.

23 Claims, 7 Drawing Figures

PATENTED MAY 29 1973 3,735,044

INVENTORS
ERIC G. LEAN
CARL G. POWELL

BY J. E. Irwinlaw
AGENT

PATENTED MAY 29 1973 3,736,044

DISPERSIVE ACOUSTICAL DEFLECTOR FOR ELECTROMAGNETIC WAVES

BACKGROUND OF THE INVENTION

1. Field of the Invention

This invention relates to acoustical deflectors for electromagnetic waves and more particularly to an acoustical deflector in which the phase velocity of the acoustic wave is a function of the frequency of the acoustic wave.

2. Description of the Prior Art

Electromagnetic deflectors using acoustic waves are known in the art, as can be seen by referring to U.S. Pat. No. 3,509,489, U.S. Pat. No. 3,506,928, and U.S. Pat. No. 3,365,581. In these deflectors, the frequency of the acoustic wave is changed in order to deflect a light beam to a different angle. By modulating the frequency of the acoustic wave, the output light beam is made to scan over an angle dependent upon the acoustic wave frequency change.

Whether these prior art deflectors operate by the well known Bragg diffraction or by phase diffraction, they are limited in their bandwidth and efficiency. Here, the bandwidth refers to the maximum change in frequency $\Delta f$ of the acoustic wave which will enable one to obtain resolvable spots of the light beam when deflected. Efficiency is the ratio of the powers of the diffracted light output to the input light. These prior art deflectors use bulk waves and generalized surface acoustic waves in which the parameter being changed is the acoustic frequency.

In order to increase the efficiency and bandwidth and to obtain a greater number of resolvable spots, the present invention proposes the use of a dispersive medium for the deflector. In this case, the velocity of the acoustic wave will be a function of the frequency of the wave and this velocity change will increase the effect caused by a frequency change in order to increase the bandwidth and efficiency of electromagnetic wave deflection.

Accordingly, it is an object of this invention to provide an acoustical deflector for electromagnetic waves having increased bandwidth.

It is another object of this invention to provide an acoustical deflector for electromagnetic waves having a greater efficiency as measured by the ratio of the deflected light output power to the input light power.

It is another object of this invention to provide an acoustical deflector of electromagnetic waves in which the number of resolvable spots obtainable is increased over the theoretical limit of resolution of prior acoustic deflectors.

It is a further object of this invention to provide an acoustical deflector for electromagnetic waves which uses guided acoustic waves.

It is a still further object of this invention to provide an acoustical deflector for electromagnetic waves which is very simple and easily fabricated using standard techniques.

BRIEF SUMMARY OF THE INVENTION

An acoustic deflector for electromagnetic waves is provided in which the acoustic waves propagate in a dispersive media. This means that the phase velocity of the acoustic waves will be a function of their frequency. The acoustic waves are propagated by conventional transducers, such as interdigital transducers, wedge transducers, etc. Any means which will excite the acoustic wave is suitable.

Located on the end of the dispersive medium is an absorbing material which absorbs the acoustic waves. If desired, this could be replaced by another transducer. If pulse type operation is used, the absorbing medium and second transducer can be omitted. It is also possible to use time resolution techniques to use a reflected acoustic pulse.

Electromagnetic waves which are propagating in the dispersive medium are deflected from their normal paths by interaction with the acoustic wave fronts. This interaction could be either Bragg scattering or phase diffraction, according to the criterion established by G. W. Willard, "Criteria for Normal and Abnormal Ultrasonic Light Diffraction Effects", Journal of the Acoustical Society of America, Vol. 21, page 101, 1949. By varying the frequency of the acoustic waves, the electromagnetic waves are deflected from their normal paths. The acoustic frequency changes also cause changes in the velocity of the acoustic wave which in turn cause further changes in deflection of the electromagnetic wave. Consequently, the number of resolvable spots obtainable, the bandwidth, and the efficiency of the deflector is substantially greater than that of conventional acoustic deflectors.

In practice, the dispersive medium is any medium which will support an acoustic wave therein and has a thickness which is approximately that of the acoustic wavelength. Guided acoustic waves in the film will undergo dispersion due to the boundary conditions of the film. The guided acoustic wave can be a generalized Rayleigh wave, a Love wave, and a Lamb wave. The film is usually deposited on a substrate. The phase wave velocity for the modes of propagation of the acoustic waves in the substrate is greater than the phase wave velocity of the acoustic waves in the film. This insures that the waves are bounded in the film, rather than radiated into the substrate. The films are any materials which will support acoustic wave propagation, such as $SiO_2$, water, etc., while the substrates are also chosen from a variety of conventional materials including lithium niobate, quartz, and glass. The substrates can be insulators or semiconductors and can be piezoelectric or not. The same is true of the film.

In another preferred embodiment, the electromagnetic beam to be deflected is a guided optical wave which is propagating in a medium such as glass. The acoustic waves propagate transversely to the path of the guided optical waves (with the proper Bragg condition) and cause deflection of the guided optical waves as the frequency (and therefore the velocity) of the acoustic wave changes. In this embodiment, the index of refraction of the substrate is less than the index of refraction of the film so that the phase velocity of the optical wave in the film is less than that in the substrate.

Both CW and pulse type operation are possible with this deflector.

The foregoing and other objects, features, and advantages of the invention will be apparent from the following more particular description of the preferred embodiments of the invention, as illustrated in the accompanying drawings.

DETAILED DESCRIPTION OF THE PREFERRED EMBODIMENTS

Figure 1:
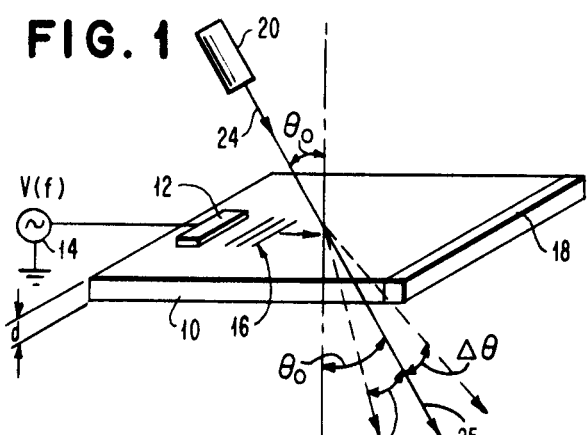
FIG. 1 is a schematic illustration of an acoustical deflector for electromagnetic waves using a dispersive medium.

FIG. 1 shows an acoustic deflector for electromagnetic waves using a dispersive medium for propagation of the acoustic waves. More particularly, a dispersive medium 10 has a transducer 12 located thereon which is excited by variable frequency voltage source 14. Excitation of transducer 12 causes acoustic waves, indicated by wave fronts 16, to be propagated in dispersive medium 10. Medium 10 is characterized in that its thickness d is of the order of the wavelength $\lambda_a$ of the acoustic waves excited by transducer 12. Located on the end of medium 10 remote from transducer 12 is an acoustic wave absorbing medium 18, which could be for instance black wax or liquid mercury. The absorber 18 is chosen to provide a match to the characteristic impedance of the acoustic propagation medium.

Electromagnetic waves produced by source 20, which can be a light source, propagate to the dispersive medium 10 and pass through this medium. In FIG. 1, the input electromagnetic waves are indicated by ray 24, which makes an angle $\theta_0$ with the normal to the medium 10. After passing through medium 10, output ray 25 exits at the same angle $\theta_0$ with the normal to the medium. Some bending (refraction) of the light rays 24 occurs upon passage in medium 10, but this is not shown in order to avoid unnecessary complication of the drawing. By varying the frequency of the acoustic waves 16, the velocity of the acoustic waves changes and the electromagnetic waves undergo deflection through angles $\pm\Delta\theta$ as indicated by the dashed arrows. This scattering could be either conventional Bragg scattering or phase diffraction, depending upon the wavelength of the incident electromagnetic waves and the effective penetration depth of the acoustic wave. Conditions for both types of interaction are described in an article by E. G. Lean and C. G. Powell, entitled "Optical Probing of Surface Acoustic Waves", which appeared in the Proceedings of the IEEE, Vol. 58, No. 12, Dec. 1970, at pages 1939–1947.

To illustrate more fully that the bandwidth, efficiency, and the resolution of an acoustic deflector using a dispersive medium is considerably greater than that of a nondispersive medium, the following analysis will mathematically describe the deflection obtainable in this type of deflector.

The theoretical limitation for the resolution of prior acousto-optic deflection schemes is generally believed to be $N = \tau\Delta f_a$. $N$ is the number of resolvable spots of the deflector, $\Delta f_a$ is the acoustic frequency bandwidth, and $\tau$ is the transit time of the acoustic wave across the electromagnetic beam diameter. However, in the present invention the resolution exceeds the old resolution limit.

For a surface acoustic light deflector, the angle of the first order beam is given by $$\sin \theta = (\lambda/v_a) f_a \qquad 1$$

where $\lambda$ is the optical light wavelength and $v_a, f_a$ are the acoustic velocity and frequency, respectively. By changing the acoustic frequency over a bandwidth of $\Delta f_a$, the diffracted light beam will scan over an angle $\Delta\theta$ given by $$\Delta\theta = (\lambda/v_a \cos\theta) \Delta f_a \qquad 2$$

For an incident optical beam having a diameter D, the number of resolvable spots of the light diffractor is $$N = \Delta\theta/\Delta\alpha = \tau\Delta f_a \qquad 3$$

where $\Delta\alpha = \lambda/D$ is the spot size of the diffracted light beam, and $\tau = D/(v_a\cos\theta)$ is the transit time of the surface acoustic wave across the laser beam diameter.

If the velocity of the acoustic wave (guided acoustic waves, for example) is dispersive and is a function of frequency, the angle $(\Delta\theta')$ scanned by varying the input frequency over a bandwidth $\Delta f_a$ becomes $$\Delta\theta' = \lambda/(v_a\cos\theta) [1 - (f_a/v_a)(\Delta v_a/\Delta f_a)] \Delta f_a \qquad 4$$

where $\Delta v_a/\Delta f_a$ is the tangent of the dispersion curve of the guided acoustic waves. The number of resolvable spots then becomes $$N' = \tau\Delta f_a[1 - (f_a/v_a)(\Delta v_a/\Delta f_a)]. \qquad 5$$

With a dispersionless acoustic wave (bulk or surface) where $\Delta v_a/\Delta f_a = 0$, Eq. (5) reduces to Eq. (3). However, if the acoustic waves are guided with a dispersion $\Delta v_a/\Delta f_a < 0$, $N'$ is larger than $N$ by a factor of $[1 + f_a/v_a |\Delta v_a/\Delta f_a|]$.

Figure 2:
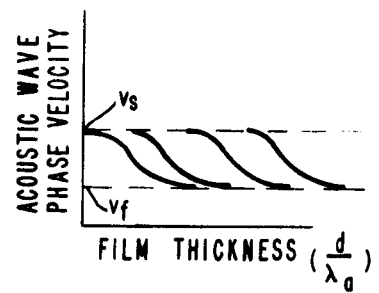
FIG. 2 is a plot of acoustic wave velocity versus acoustic frequency for various modes of propagation for the dispersive medium of FIG. 3.

FIG. 2 is a plot of various modes of propagation of the acoustic wave phase velocity in medium 10 as a function of the acoustic frequency. It can be seen from this that the phase velocity of acoustic wave 16 varies depending upon the frequency of these waves, due to the dispersion of the medium. In a general case, dispersion can be caused by boundary conditions or by inherent properties of the medium. When the thickness of the medium is of the order of the acoustic wavelength, dispersion (due to boundary conditions) will result and the acoustic phase velocity will vary depending upon the frequency of the acoustic wave. If the medium is unbounded (thickness much greater than the wavelength of the acoustic wave) dispersion based on boundary conditions will not occur.

Dispersion can also result from the properties of the medium in which the acoustic wave propagates. In this situation, the lattice periodicity is of the order of the acoustic wavelength so that dispersion will result. If the acoustic wavelength is much greater than the lattice spacing, the material will appear as a continuum and no dispersive effect will be seen.

Figure 3:
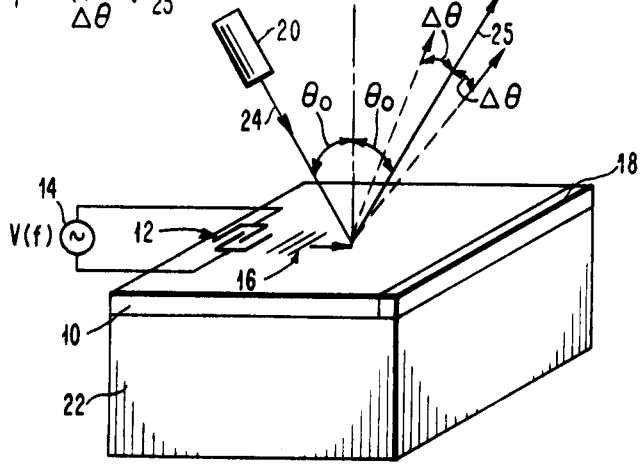
FIG. 3 is an illustration of an acoustic deflector for electromagnetic waves using a thin film dispersive medium on an underlying substrate.

FIG. 2 is more appropriately described in conjunction with the embodiment shown in FIG. 3. That is, the maximum phase velocity occurs for long acoustic wavelengths. In this case, the acoustic velocity is largely determined by the substrate 22. For the minimum phase velocity occurring at short acoustic wavelengths (high frequencies), the phase velocity is largely determined by the film 10. Between these two extremes, a smooth curve is obtained.

FIG. 3 shows an acoustic deflector in which the thin film 10 is located on a substrate 22. The film is generally deposited on the substrate by sputtering, evaporation, etc. or by growing it on the substrate. The interface between the film and the substrate is smooth, i.e., less than a fraction of the wavelength of the acoustic waves in order to prevent scattering of the acoustic waves and the light waves at the interface. The film 10 is usually deposited on a substrate 22 and can be any material which will support a guided acoustic wave therein, including insulators and semiconductors. It is not necessary that the film 10 be piezoelectric, but piezoelectric materials are desirable because of the ease with which acoustic waves can be introduced into such films. The thickness of film 10 is of the order of the wavelength of acoustic waves therein and is generally between 1 and 10 microns. There is no limit to the frequency of the acoustic waves other than that of attenuation in the film. Neither the film 10 nor the substrate 22 need be a single crystal. As was mentioned previously, the phase velocity of the acoustic wave is less in the film than in the substrate so that the acoustic waves are bounded in the film. In more detail $V_R$ and $V_T$ are the phase velocities of Rayleigh waves and bulk shear waves in the substrate while $V'_R$ and $V'_T$ refer to these same phase velocities in an overlying film. If the material of the film is denser and less stiff than the substrate (roughly, $V_R > V'_R$; $V_T > V'_T$), then three types of waves occur. These are the Rayleigh wave, the Love wave, and the Sezawa or M-Z wave. The Love wave requires only that $V_T > V'_T$. These considerations are known in the acoustic wave art and are discussed more completely in an article by H. I. Smith, which appears in the International Journal of Nondestructive Testing, Vol. 2, pages 31–59 (1970).

Located on film 10 is a transducer 12, here indicated by an interdigital transducer. However, this transducer could be a prism transducer or any other type suitable for propagating waves in film 10. Transducer 12 is excited by variable frequency voltage source 14. Located at the end of film 10 remote from transducer 12 is the acoustic wave absorption medium 18. As was mentioned previously, this is any material suitable for absorption of acoustic waves, such as liquid Hg or black wax. The acoustic waves produced by transducer 12 have wavefronts indicated by the lines 16 and propagate in the direction of the arrow.

Electromagnetic waves from source 20, which can be a light source, are incident upon film 10, making an angle $\theta_0$ with the normal to the plane of film 10. The input electromagnetic waves, indicated by ray 24, travel through film 10 and are reflected from the top surface of substrate 22. Some bending of rays 24 occurs in film 10, as explained previously, but this is not shown here for ease of explanation, since it is not critical to the invention. It will not be shown in other embodiments also, for the same reason. Normally, specular reflection occurs (ray 25) and the angle of reflection is also $\theta_0$. However, when the frequency of the acoustic wave 16 is varied by varying the frequency of voltage source 14, the reflected light waves will be deflected over an angle $\pm\Delta\theta$, depending upon whether the acoustic frequency is increased or decreased. Because the medium 10 is dispersive, the velocity of the acoustic waves will also change and the angle $\Delta\theta$ obtainable will be greater than that obtained with normal acoustic deflectors. The deflected rays then strike utilization means 23, which can be, for instance, a photodetector.

Figure 4:
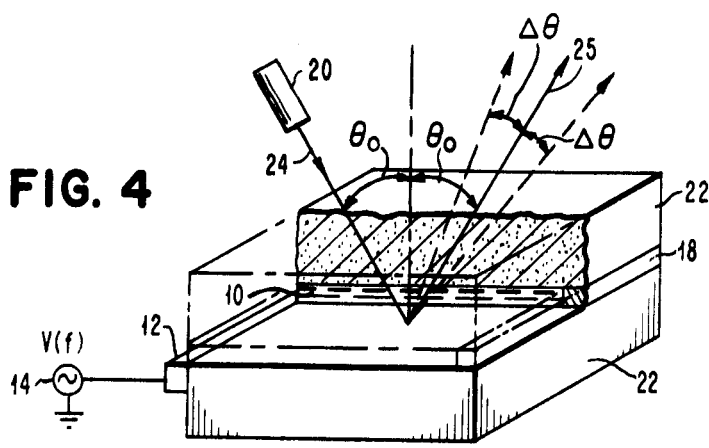
FIG. 4 is an embodiment of an acoustical deflector for electromagnetic waves using a thin film of liquid, such as water, for a dispersive acoustic wave propagating medium.

FIG. 4 shows an embodiment for an acoustic deflector in which the film 10 is a liquid, such as water. The film 10 could also be a solid such as $SiO_2$. Film 10 is located between two substrates 22 which can be the same materials, or different materials. Suitable choices include lithium niobate, glass, quartz, and conventional optical flats. The liquid 10 is a thin film located between substrates 22 and acoustic waves are initiated in substrate 22 by transducer 12. Although the acoustic waves are initially generated in substrate 22, they move to the film 10 because the phase velocity of the particular mode of acoustic wave propagation in film 10 is less than that in substrate 22. As with FIGS. 1 and 3, transducer 12 is excited by a variable frequency voltage source 14. The liquid comprising film 10 easily stays between substrates 22 due to surface tension. The thickness of liquid film 10 is of the order of the wavelengths used for the acoustic wave. An acoustic absorber 18 is also provided.

Operation of the deflector of FIG. 4 is essentially the same as that for the deflector of FIG. 3. That is, input electromagnetic waves, shown here as rays 24 emanating from light source 20, pass through transparent substrate 22 and interact with the acoustic waves travelling in film 10. The rays then reflect from the top surface of the bottom substrate and exit as rays 25, making an angle $\theta_0$ with the normal to the film 10. When the frequency of the acoustic waves is varied, their velocity is also varied and the reflected rays 25 are then made to deflect over angles $\pm\Delta\theta$.

Figure 5:
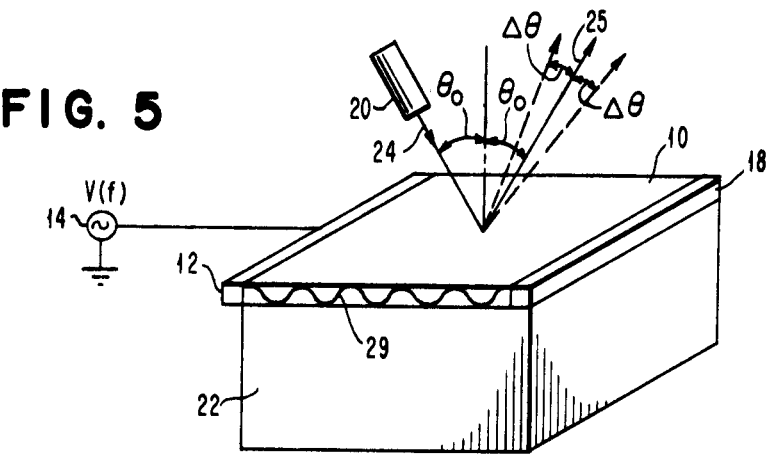
FIG. 5 is another embodiment of an acoustical deflector of electromagnetic waves in which bulk acoustic waves propagate in a thin film deposited on a substrate.

In the embodiment of FIG. 5, the film 10 is deposited on substrate 22 and guided acoustic bulk waves (Lamb waves), indicated by curve 29, are propagated in film 10. These bulk waves are produced by transducer 12 which is excited by variable frequency voltage source 14. If desired, an acoustic wave absorbing medium 18 can be located on the end of medium 10 remote from transducer 12, as shown in FIG. 5.

As in the previous embodiments, the shear wave velocity for acoustic waves in medium 10 is less than that in substrate 22. This ensures that the acoustic waves will remain in film 10. To obtain dispersion, the thickness of film 10 is approximately of the order of the wavelengths of the acoustic waves in film 10.

This deflector works in the same manner as the previously shown deflectors. That is, electromagnetic energy from light source 20 propagates in the direction of arrow 24 to the film 10. After passage through film 10, the light is reflected from the top surface of substrate 22 and exits as indicated by ray 25. When the frequency of the acoustic wave 29 is changed, its velocity changes also, and output light rays 25 are deflected through angles $\pm\Delta\theta$.

Figure 6A:
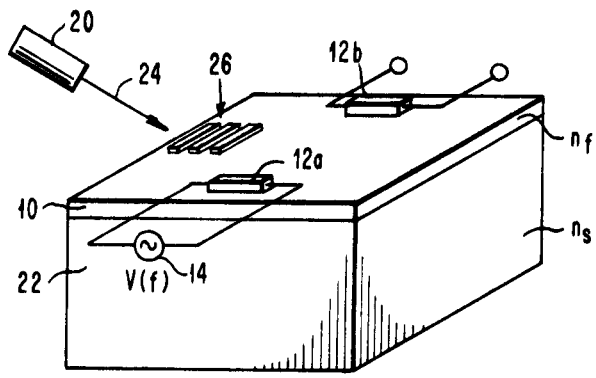
FIG. 6A is an illustration of an acoustic deflector for guided optical waves.
Figure 6B:
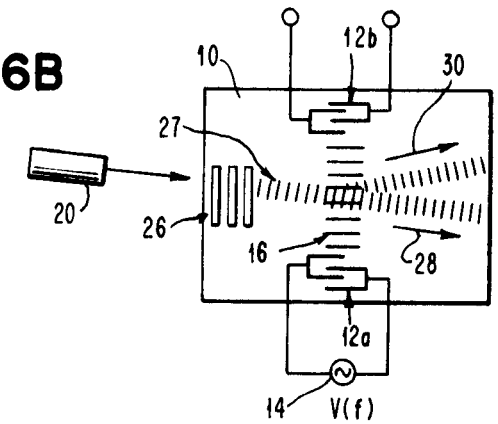
FIG. 6B is a top view of the deflector of FIG. 6A showing the paths of the guided optical wave and the acoustic wave used to deflect the guided optical wave.

The embodiment shown in FIGS. 6A and 6B provides deflection of guided optical waves. In this embodiment, the dispersive film 10 is deposited on substrate 22 and acoustic transducers 12a, 12b are placed on film 10. One of these transducers (12a) is the input transducer and is connected to variable frequency voltage source 14. The other transducer (12b) merely serves to convert the acoustic waves 16 to electrical signals. If desired, a standing acoustic wave pattern can be established in film 10. Transducer 12b is not required, as mentioned previously. An absorbing medium can be used, or film 10 can be left as it is, without additional elements. In this case, acoustic waves will reflect from the end of film 10, and these can be used for diffraction of the input electromagnetic waves.

Also located on film 10 is a grating coupler 26 which produces guided optical waves in film 10 when light rays 24 are produced by light source 20. Grating coupler 26 changes the angle of input light rays 24 so that they will be totally internally reflected in film 10 and will be trapped in that film, thereby producing optical guided waves in film 10. Operation of such a coupler is explained in more detail in an article by L. Kuhn et al appearing in Applied Physics Letters, Vol. 17, No. 6, Sept. 15, 1970, at page 265.

Referring to FIG. 6B, the guided optical wavefronts 27 are deflected by the acoustic wavefronts 16. When the frequency of the acoustic wave is changed, the optical guided wave is deflected from its normal path (arrow 28), in a manner similar to that previously explained.

In the optical guided wave deflector of FIGS. 6A and 6B, the phase velocity of light in film 10 is less than that in the substrate 22 so that the optical wave is contained in film 10. This means that the index of refraction of film 10 is greater than that of the substrate 22. This consideration is in addition to the previously discussed consideration that shear wave velocity of the acoustic waves must be smaller in film 10 than it is in substrate 22.

As an example of this invention, both guided acoustic waves (bulk waves) and surface acoustic waves (non-dispersive) have been excited in a thin yz $LiNbO_3$ slab by a few interdigital fingers. The frequency range was 300–400 MHz. By changing the frequency of the acoustic waves ($\Delta f_a = 100$ MHz), a light spot diffracted by the non-dispersive surface acoustic waves scanned over an angle of 1°, while the light spot diffracted by the dispersive guided bulk acoustic waves scanned over an angle of 3°. In the case of the non-dispersive waves, the number of resolvable spots was 300 in 3 microseconds transit time. In the case of the dispersive guided acoustic waves, the number of resolvable spots was 900 in 3 microseconds transit time, an improvement factor of 3.

The dispersion of guided acoustic waves is determined by the thickness of the thin film in which they propagate and by the propagation mode in that film. (A typical dispersion curve was shown in FIG. 2.) It is within the skill of the art to design the dispersion of the guided acoustic waves so that the factor $[1 + (f_a/v_a)(\Delta v_a/\Delta f_a)]$ is a maximum, to maximize the resolution.

What has been described is a deflector for electromagnetic radiation in which acoustic waves are used. These acoustic waves propagate in a medium having dispersion so that changes in frequency of the acoustic wave will produce changes in the velocity of the acoustic wave also. This leads to greater bandwidth, resolution, and efficiency than is present in conventional acoustic deflectors. Both CW operation and pulse type operation is possible. For CW operation, the acoustic transducer and the source of electromagnetic waves is operated CW.

It should be understood that the basic principle of this deflector involves the use of dispersion and that any means which produces the dispersion can be utilized. While guided acoustic waves are shown as a particularly suitable means for producing dispersion, it should be understood that other types of acoustic waves having dispersion could also be used. This leads to the possibility of using many different types of acoustic propagation means as long as acoustic frequency changes will also produce changes in acoustic phase velocity.

What is claimed is:

1. An acoustic wave deflector for electromagnetic waves incident thereon, comprising:
    a medium which is dispersive to acoustic waves propagating therein, said acoustic waves having a phase velocity in said medium which is a function of the frequency of said acoustic waves;
    means for generating variable frequency acoustic waves in said dispersive medium, said acoustic waves interacting with said electromagnetic waves in said dispersive medium to deflect said electromagnetic waves in accordance with the frequency changes of said acoustic waves.

2. The deflector of claim 1, where said acoustic waves are guided acoustic waves, said medium having a thickness which is of the order of the wavelengths of said acoustic waves therein.

3. The deflector of claim 2, where said acoustic waves are selected from the group consisting essentially of Rayleigh surface waves, guided bulk waves, and Love waves.

4. The deflector of claim 1, where said electromagnetic wave is an optical wave.

5. The deflector of claim 4, where said optical wave is a guided optical wave which propagates in said dispersive medium.

6. An acoustic wave deflector for electromagnetic waves which are incident thereon, comprising:
    a thin film medium in which said acoustic waves can be propagated, said film being dispersive for said acoustic waves such that the phase velocity of said acoustic waves in said medium is a function of their frequency;
    means for generating acoustic waves of variable frequency in said film;
    a substrate on which said medium is located, the phase velocity of said acoustic waves being greater in said substrate than in said film, said acoustic waves interfering with said electromagnetic waves in said film to cause deflection of said electromagnetic waves when the frequency of said acoustic waves changes.

7. The deflector of claim 6, where said film has a thickness of the order of the wavelengths of said acoustic waves.

8. The deflector of claim 6, where said acoustic waves are selected from the group consisting essentially of guided bulk waves, Rayleigh surface waves, and Love waves.

9. The deflector of claim 6, further including an absorbing medium located on said film for absorbing said acoustic waves after interaction between said acoustic waves and said electromagnetic waves in said film.

10. The deflector of claim 6, where said electromagnetic waves are guided optical waves propagating in said film, the index of refraction of said substrate being less than the index of refraction of said film.

11. The deflector of claim 6, where said film is a piezoelectric material.

12. The deflector of claim 6, where said acoustic waves cause Bragg scattering of said electromagnetic wave in said film.

13. An acoustic wave deflector for electromagnetic waves which pass through said deflector, comprising:
a medium located in the path of said electromagnetic waves in which said acoustic waves propagate, the thickness of said medium being of the order of the wavelength of said acoustic waves in said medium;
means for generating variable frequency acoustic waves in said medium;
a substrate on which said medium is located having wave propagation properties such that the phase velocity of said acoustic waves in said substrate is greater than that in said medium;
utilization means responsive to said electromagnetic waves after passage of said electromagnetic waves through said medium, said electromagnetic waves interacting with said acoustic waves in said medium and being deflected through varying angles in accordance with the frequency of said acoustic waves.

14. The deflector of claim 13, in which said electromagnetic waves are light waves.

15. The deflector of claim 13, where said acoustic waves are selected from the group consisting essentially of guided bulk waves, Rayleigh surface waves, and Love waves.

16. The deflector of claim 13, further including an acoustic absorber located on said medium for absorbing said acoustic waves after interaction with said electromagnetic waves.

17. an acoustic wave deflector for electromagnetic waves which pass therethrough, comprising:
a medium which is dispersive to acoustic waves propagating therein, the velocity of said acoustic waves in said medium being a function of their frequency;
a substrate for said dispersive medium, said medium being in contact with said substrate and having a phase velocity for said acoustic waves which is less than that in said substrate;
transducer means for generating variable frequency acoustic waves in said medium which interact with said electromagnetic waves to deflect said electromagnetic waves in accordance with the frequency of said acoustic waves;
absorbing means located on said medium for absorbing said acoustic waves after interaction with said electromagnetic waves;
utilization means responsive to said electromagnetic waves after passage through said dispersive medium.

18. The deflector of claim 17, where said electromagnetic waves are light waves.

19. The deflector of claim 17, where said dispersive medium has a thickness of the order to the wavelengths of said acoustic waves.

20. The deflector of claim 17, where said dispersive medium is piezoelectric.

21. An acoustic wave deflector for electromagnetic waves which pass therethrough, comprising:
a medium which is dispersive for acoustic waves propagating therein, the velocity of said acoustic waves in said medium being a function of their frequency;
a substrate for said dispersive medium, said medium being in contact with said substrate and having a phase velocity for said acoustic waves which is less than that in said substrate;
transducer means for generating variable frequency acoustic waves in said medium which interact with said electromagnetic waves to deflect said electromagnetic waves in accordance with the frequency of said acoustic waves;
means for exciting guided electromagnetic waves in said dispersive medium, said guided waves interacting with said acoustic waves in said medium and being deflected through angles dependent upon the frequency of said acoustic waves.

22. The deflector of claim 21, where said means for exciting guided electromagnetic waves includes a light source.

23. The deflector of claim 21, where said dispersive medium has a thickness of the order of the wavelengths of said acoustic waves.

* * * * *